US008086843B2

(12) United States Patent
Hughes et al.

(10) Patent No.: US 8,086,843 B2
(45) Date of Patent: Dec. 27, 2011

(54) PERFORMING CRYPTOGRAPHIC PROVIDER FAILOVER

(75) Inventors: Sarah Blodgett Hughes, Wappingers Falls, NY (US); Jason Greg Katonica, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/860,130

(22) Filed: Sep. 24, 2007

(65) Prior Publication Data

US 2009/0080656 A1    Mar. 26, 2009

(51) Int. Cl.
*H04L 29/06* (2006.01)
*H04K 1/00* (2006.01)

(52) U.S. Cl. ......... 713/150; 380/272; 713/189; 713/191
(58) Field of Classification Search ............... 380/1, 272; 713/150
See application file for complete search history.

(56) References Cited

U.S. PATENT DOCUMENTS

| | | | |
|---|---|---|---|
| 3,764,742 A * | 10/1973 | Abbott et al. ................. | 713/185 |
| 6,078,957 A | 6/2000 | Adelman et al. | |
| 6,412,069 B1 * | 6/2002 | Kavsan ......................... | 713/164 |
| 6,473,794 B1 | 10/2002 | Guheen et al. | |
| 6,757,822 B1 * | 6/2004 | Feiertag et al. ............... | 713/152 |
| 7,373,504 B1 * | 5/2008 | Belgaied et al. .............. | 713/164 |
| 7,602,903 B2 * | 10/2009 | Ene-Pietrosanu et al. ........ | 380/2 |
| 2003/0005279 A1 * | 1/2003 | Valenci et al. ................ | 713/150 |
| 2003/0097576 A1 * | 5/2003 | Dutta et al. ................... | 713/189 |
| 2006/0149962 A1 * | 7/2006 | Fountain et al. .............. | 713/151 |
| 2006/0155997 A1 | 7/2006 | Fritzges et al. | |

OTHER PUBLICATIONS

Ioannidis, Sotiris, et al., "Implementing a Distributed Firewall" CCS' 00, 2000, 10p, Athens, Greece.
Just, James E., et al., "Review and Analysis of Synthetic Diversity for Breaking Monocultures" WORM' 04, Oct. 29, 2005, 10p, Washington, D.C., United States.

* cited by examiner

*Primary Examiner* — Taghi Arani
*Assistant Examiner* — Mohammad Rahman
(74) *Attorney, Agent, or Firm* — Cantor Colburn LLP; William A. Kinnaman, Jr.

(57) ABSTRACT

Cryptographic provider failover is performed. Upon receipt of a first security request, an integrated cryptographic provider constructs a table including a list of underlying cryptographic providers for service type algorithm pairs. The integrated cryptographic provider is one of the underlying cryptographic providers in the list. The underlying cryptographic providers are registered as hardware and software cryptographic providers in the list. The integrated cryptographic provider is registered as a routing cryptographic provider in the list. The list is arranged so that the integrated cryptographic provider has the highest priority. The integrated cryptographic provider specifies failover support for all registered service type algorithm pairs using one or more of the underlying cryptogaphic providers. In response to a subsequent security request, the integrated cryptographic utilizes the list of the underlying cryptographic providers to identify a second cryptographic provider to which the request will be routed if a first cryptographic provider fails.

16 Claims, 10 Drawing Sheets

US 8,086,843 B2

PERFORMING CRYPTOGRAPHIC PROVIDER FAILOVER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to computer executable cryptographic algorithms and, more particularly, to methods and computer program products for performing cryptographic provider failover from one security provider to another in a Java™ Virtual Machine (JVM).

2. Description of Background

Many software applications exploit cryptographic algorithms implemented using hardware, software, firmware, or any of various combinations thereof. It is often necessary to perform cryptographic algorithms in the context of a volatile hardware environment, with the effect that one or more cryptographic requests may fail. For example, an illustrative hardware environment may permit online and offline changes to be made to processors and other cryptographic mechanisms in a dynamic manner. These changes have the effect of disabling or enabling hardware-provided cryptographic support.

The Java™ virtual machine (JVM) is the environment in which all Java™ programs execute. It includes the Java™ Security Framework which provides cryptographic services such as key generators, ciphers and signatures. The Java™ Cryptographic Extension (JCE) is an architecture specification for cryptographic providers that register with the Java™ Security Framework to provide cryptographic services in the JVM. It should be noted herein that Java™ is a registered trademark and, for purposes of clarity and expediency, the term "Java" will be used hereinafter as a substitute for the term "Java™".

Java Cryptography Extension (JCE) represents one example of a cryptographic environment in which hardware-provided cryptographic support may be disabled. The JCE architecture does not provide for automatic failover from one cryptographic provider to another. Java provides a Java Security Framework that includes a java.security provider list associating each of one or more service type—algorithm pairs with a corresponding preference list of one or more cryptographic service providers. In general, a failover could be implemented using any other registered provider that has different dependencies than the failing provider. Failover could be implemented using a software provider, a provider with firmware dependencies, or another hardware provider with different dependencies than the failing provider.

During JVM initialization, the Java Security Framework invokes each security provider listed in the java.security provider list. When a JCE provider initializes itself, it registers with the Java Security Framework for each serviceType.algorithm combination that it can perform. JCE security providers are available from various vendors and an installation might implement its own JCE security provider. The specific security providers in the list, and the order they appear in the list, are configurable by the installation. Some providers have external dependencies. For example, a JCE security provider might depend on certain features in a hardware platform. Another provider might have a dependency on some floating point operations engine in a software platform.

A platform with cryptographic hardware and/or cryptographic processors can be volatile. Changes in the availability of cryptographic hardware or cryptographic processors can have the effect of disabling or enabling (in part or completely) a Java security provider that exploits the cryptographic features in the platform. This can cause a provider to be unable to perform operations for a serviceType.algorithm that it registered with the Java Security Framework.

A client application that uses services provided by security providers could hard-code the provider it wants to use. However, for reasons of portability and flexibility, the client application typically does not specify a provider. Instead the application permits the Java Security Framework to select a provider based on the provider registrations. When a security provider is not specified by the client application, the Java Security Framework selects the first provider registered for the serviceType.algorithm. For example, a client application utilizes a provider by obtaining an instance of an encryption algorithm that performs a series of encryption and decryption operations. This provider is used until requests for encryption and/or decryption operations are completed or until an error occurs.

As indicated above, the JCE architecture does not provide automatic failover from one cryptographic provider to another. Consequently, if a provider is unable to perform the requested operations, the provider will throw an exception that is passed up to the application. In general, it is not advisable for the application to start over again because, unless there is a change in the status of cryptographic features on the platform, the outcome will be the same for subsequent executions of the application. This is because the provider registrations are static so the Java Security Framework will select the same provider each time.

In order for the application to try another provider, it would have to query the Java Security Framework and determine what providers have registered for the serviceType.algorithm. This is a more complex process than is generally performed in an application catch block, and requires Java security knowledge beyond the expertise of most application programmers. Accordingly, a solution is needed to provide applications the ability to leverage platform cryptographic features when available and, at the same time, provides failover to another registered provider in situations where a call to one provider has failed. An effective solution would require no customization of the Java Security Framework and no changes to client applications.

SUMMARY OF THE INVENTION

According to an exemplary embodiment, a method and computed program product are provided for performing cryptographic provider failover via computer instructions in a storage device of a computer. The method via the computer instructions in the storage device of the computer includes upon receipt of a first security request, constructing by the integrated cryptographic provider a table comprising a list of a plurality of underlying cryptographic providers for a plurality of service type algorithm pairs on the computer. The integrated cryptographic provider is one of the plurality of underlying cryptographic providers in the list of the table. The plurality of underlying cryptographic providers are registered as hardware cryptographic providers and software cryptographic providers in the list of the table, and the integrated cryptographic provider is registered as a routing cryptographic provider in the list of the table. The method includes arranging the list in the table of the plurality of underlying cryptographic providers so that the integrated cryptographic provider registered as the routing cryptographic provider has the highest priority in the list in the table and so that the plurality of underlying cryptographic providers have a lower priority in the list in the table than the integrated cryptographic provider. The method includes utilizing the integrated cryptographic provider to specify failover support for all registered service type algorithm pairs using one or more of the plurality of underlying cryptographic providers. In response to a subsequent security request received from an application, the integrated cryptographic provider being the routing cryptographic provider that constructed the table utilizes the list of the plurality of underlying cryptographic providers to identify a second cryptographic provider to which the request will be routed if a first cryptographic provider fails.

Other methods, and/or computer program products according to embodiments will be or become apparent to one with skill in the art upon review of the following drawings and detailed description. It is intended that all such additional methods and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

For illustrative purposes, embodiments of the invention will be described in the context of the Java programming language, it being clearly understood that the methods and computer program products of the present invention are equally applicable to any environment where cryptographic failure support is desired or required. Security Application Program Interface (API) is a core API of the Java programming language that is designed to allow developers to incorporate both low-level and high-level security functionality into their programs. Security functionality may be implemented using a Java™ Cryptography Extension (JCE) that provides a framework for encryption, key generation and key agreement, and Message Authentication Code (MAC) algorithms. Support for encryption includes symmetric, asymmetric, block, and stream ciphers, as well as Data Encryption Standard (DES).

The JCE architecture includes a java.security cryptographic provider preference file associating each of one or more service type—algorithm pairs with a corresponding preference list of one or more providers. The preference file includes a description of a security service. The preference file encapsulates the properties of a service and contains a factory method to obtain new implementation instances of this service. Each service is associated with a provider that offers the service, a type, an algorithm name, and the name of the class that implements the service. Optionally, the preference file also includes a list of alternate algorithm names for this service (aliases) and attributes, which may include a map of (name, value) String pairs.

Figure 1:
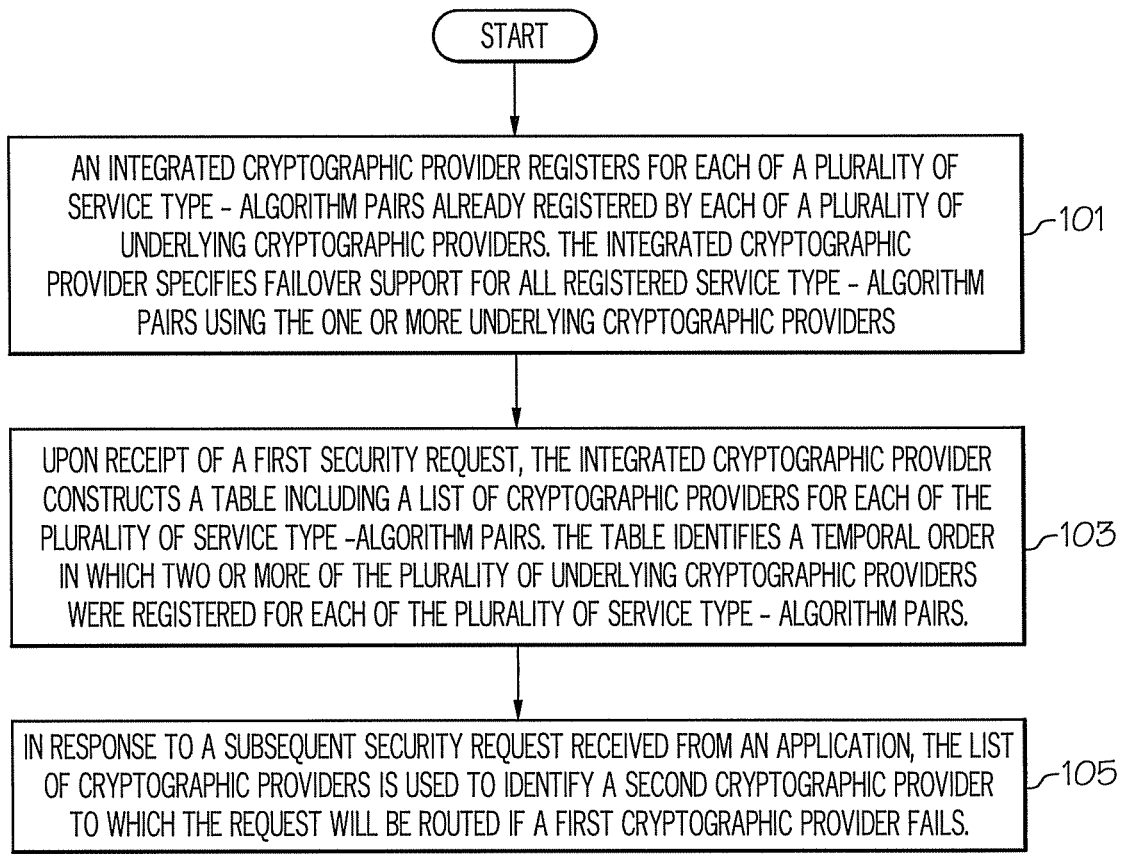
FIG. 1 illustrates a generalized exemplary method for performing cryptographic provider failover.

FIG. 1 illustrates a generalized exemplary method for performing cryptographic provider failover. The procedure of FIG. 1 commences at block 101 where an integrated cryptographic provider registers for each of a plurality of service type—algorithm pairs already registered by each of a plurality of underlying cryptographic providers. The integrated cryptographic provider specifies failover support for all registered service type—algorithm pairs using the one or more underlying cryptographic providers.

Next, at block 103, upon receipt of a first security request, the integrated cryptographic provider constructs a table including a list of cryptographic providers for each of the plurality of service type—algorithm pairs. The table identifies a temporal order in which two or more of the plurality of underlying cryptographic providers were registered for each of the plurality of service type—algorithm pairs. At block 105, in response to a subsequent security request received from an application, the list of cryptographic providers is used to identify a second cryptographic provider to which the request will be routed if a first cryptographic provider fails.

Figure 2:
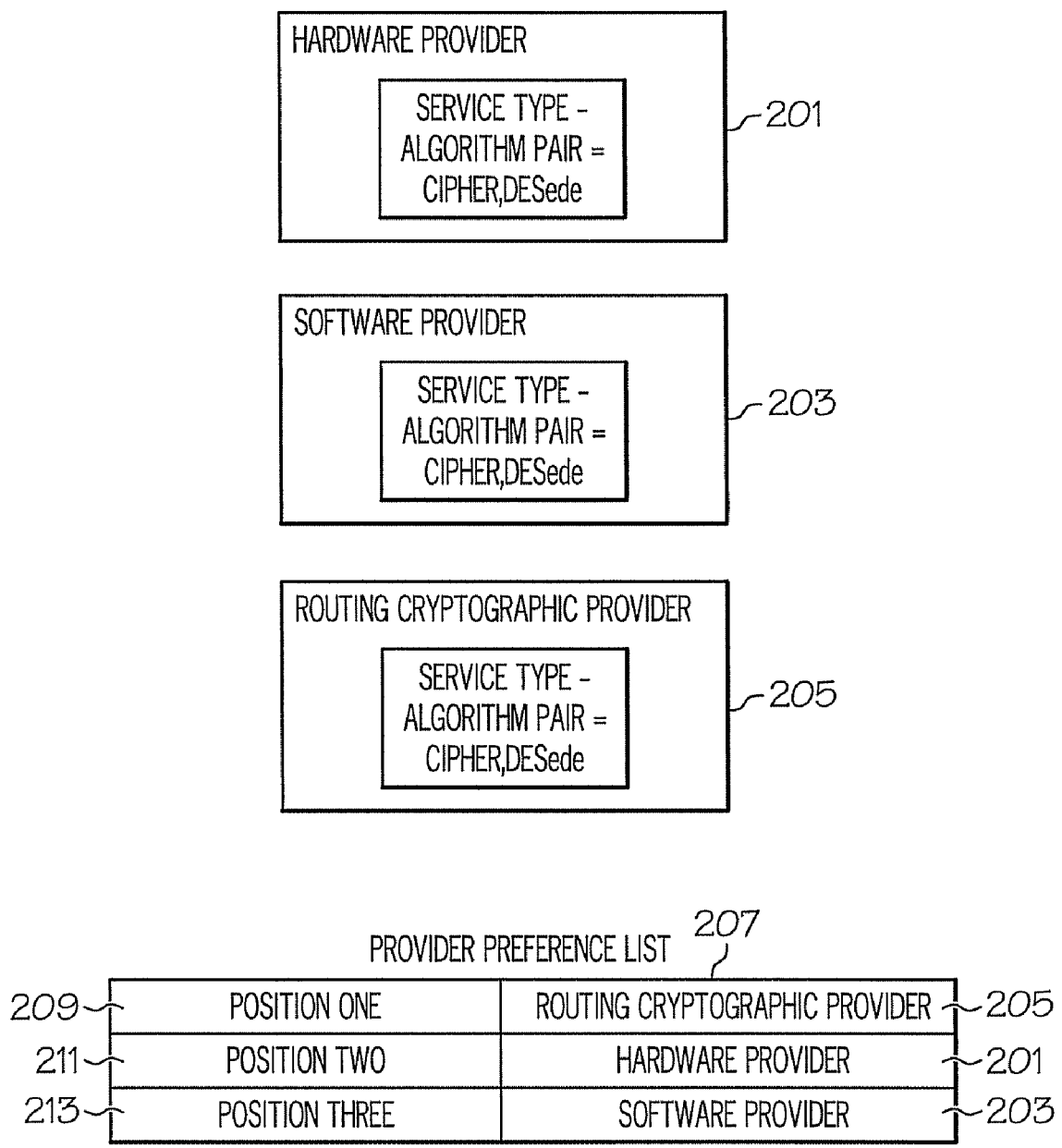
FIG. 2 illustrates a specific exemplary method for performing cryptographic provider failover.

FIG. 2 illustrates a specific exemplary method for performing cryptographic provider failover in the operational environment of Data Encryption Standard (DES). DES is a widely-utilized method of data encryption using a private (secret) key. With reference to FIG. 2, consider the following cryptographic provider definitions which each contain the same service type—algorithm pair. A hardware provider 201 contains a hardware implementation of a service type—algorithm pair denoted as Cipher/DESede. Likewise, a software provider 203 contains a hardware implementation of the service type—algorithm=Cipher/DESede. Finally, a routing cryptographic provider 205 contains a registration for the service type—algorithm=Cipher/DESede. Assume that a user configures their environment to have a provider preference list 207 wherein a cryptographic service type—algorithm is fetched in the user's environment in accordance with the listed order. Position one 209 is denoted as the highest preference, position two 211 is denoted as an intermediate preference, and position three 213 is denoted as the lowest preference.

Position one 209 specifies routing cryptographic provider 205, whereas position two 211 specifies hardware provider 201 and position three 213 specifies software provider 203.

Any application which fetches the Cipher/DESede service type—application pair will be granted the request from routing cryptographic provider 205 since it has the highest preference on provider preference list 207. Routing cryptographic provider 205 is then given the task of completing the DESede algorithm using underlying cryptographic providers which, in this example, include hardware provider 201 and then, secondly, software provider 203. If an error occurs during execution in a hardware provider 201 implementation of DESede, then the request will be routed to a software provider 203 implementation of DESede.

Routing cryptographic provider 205 can optionally perform a check to ensure that a request (i.e., a security request) satisfies a set of requirements before routing the request to hardware provider 201. This optional step helps to mitigate the amount of failover that needs to occur. Additionally or alternatively, routing cryptographic provider 205 can optionally be used to provide an additional layer of smart cryptographic routing. This smart routing may include checking to see if hardware is available, checking one or more key sizes, checking one or more key types, or various combinations thereof. By gathering such information and routing it to an appropriate cryptographic provider, it is possible to utilize this seamless approach to avoid making bad cryptographic calls.

In some cases, hardware to software failover may not be possible in routing cryptographic provider 205. One example is in the case of streaming encrypted data. When performing Triple DES encryption in Cipher Block Chaining (CBC) mode, incoming data is encrypted and chained to previous data that was encrypted to form a stream of encrypted data. If an error occurs during the middle of encrypting this stream, the data used during the early part of this stream would be needed to create the entire stream in a different provider. This data may not be available to start the operation over again using the second cryptographic provider. An error would then be returned to the user since the encrypted data stream is not eligible for failover support.

As indicated previously, the foregoing concepts discussed in connection with FIGS. 1 and 2 are applicable to the Java JCE architecture but can also be applied to any environment where cryptographic failure support is needed or desired. In general terms, any other service type—algorithm providers outside of the JCE architecture could also implement this concept of having a failover provider. For example, in the Java environment, a new Java 2 Enterprise Edition (JSEE) provider could be created to provide failover support from one JSEE provider to another in the case of an error.

The integrated cryptographic provider of FIG. 1 and the routing cryptographic provider 205 of FIG. 2 may, but need not, represent the same entity. Moreover, the integrated cryptographic provider of FIG. 1 and the routing cryptographic provider 205 of FIG. 2 may be implemented using a Hybrid Provider 303 as indicated in FIGS. 3-10 (to be described in greater detail hereinafter). With respect to FIGS. 3, 4, 5, 7, and 9, as a convenient notation, when calls to a Java Security Framework 301 are nested, a flow visible to an application program 313 will be designated as a request and a result, a first nested flow will be designated as a request$^1$ and a result$^1$, a second nested flow will be designated as a request$^2$ and a result$^2$, and so on.

Configuring a Java Security Environment for Hybrid Provider 303

Figure 3:
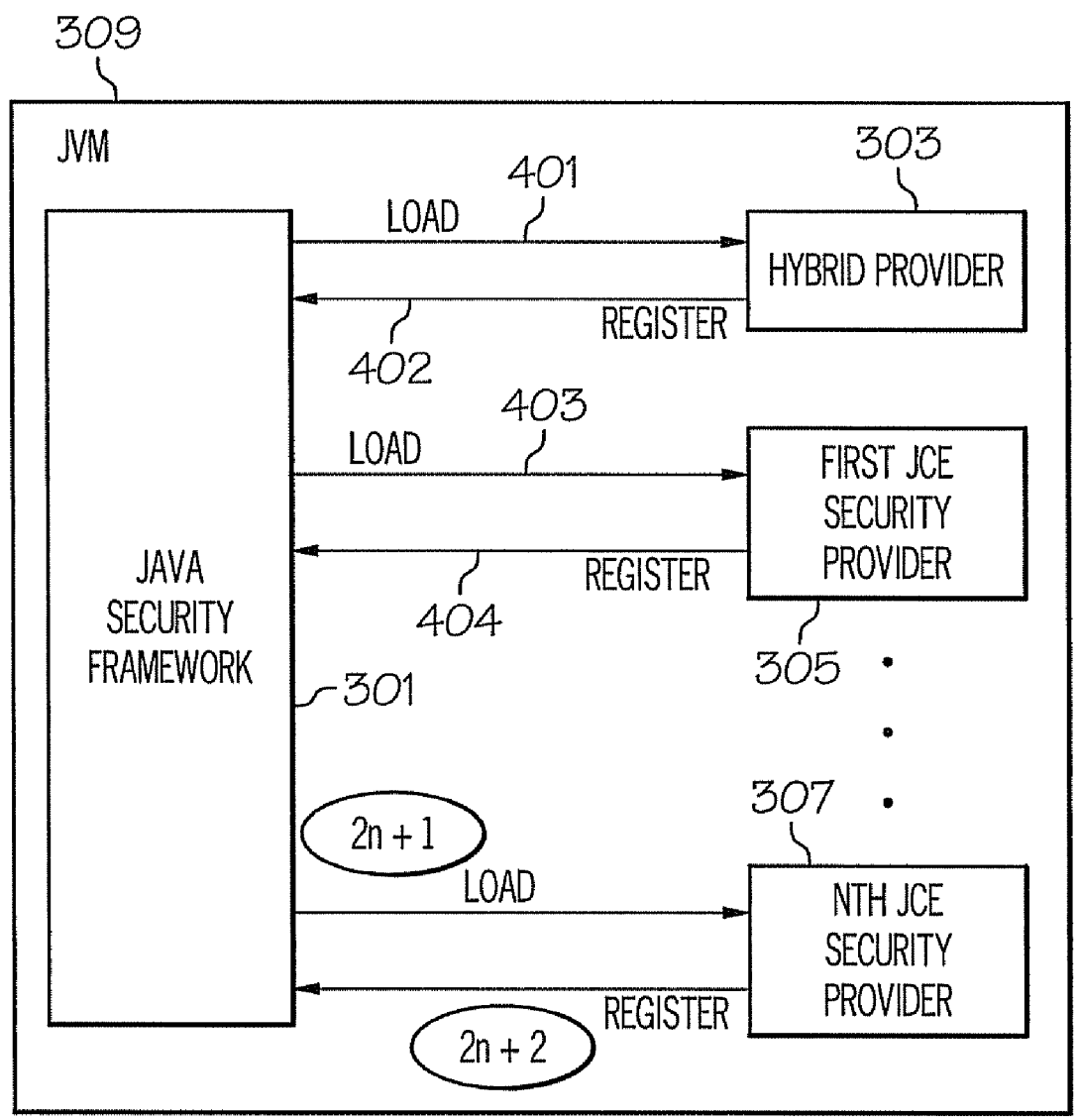
FIG. 3 illustrates an exemplary method for initializing a Java security environment in a Java virtual machine (JVM).

With reference to FIG. 3, during start-up of a Java Virtual Machine (JVM) 309, the Java Security Framework 301 initializes a Java security environment using configuration information in a file denoted lib/security/java.security. Among other configuration details, this file includes the provider list, and an ordered list of security providers. The Hybrid Provider 303 should be the first provider in this list so that it is the first registered provider for each serviceType.algorithm for which it will provide fail-over. A jar file containing the Hybrid Provider 303 implementation should be in an effective CLASSPATH. By convention, the jar file is usually located in a lib/ext/directory.

Initialization of the Java Security Environment

FIG. 3 illustrates an exemplary method for initializing the Java security environment in the JVM 309. During JVM 309 start-up, a Java Security Framework 301 loads each security provider in a java.security provider list, such as the Hybrid Provider 303, a first JCE security provider 305, and an nth JCE security provider 307. When a security provider is loaded, it calls the Java Security Framework 301 to register itself for each serviceType.algorithm that it implements. The security providers are loaded in order. The Hybrid Provider 303 loads at step 401 and registers at step 402. First JCE security provider 305 loads at step 403 and registers at step 404.

Registration includes providing a standard name of a serviceType for the serviceType.algorithm, a name of the algorithm, and a security provider class that supports the serviceType.algorithm. The Java Security Framework 301 creates a table of providers by serviceType.algorithm based on registrations. This list is used by the Java Security Framework 301 when an application does not specify a provider on a getInstance( ) call.

The Hybrid Provider 303 is first in the provider list in the lib/security/java.security file, so the Hybrid Provider 303 will be the first registered provider for each serviceType.algorithm it registers. As a consequence, the Hybrid Provider 303 will be the provider chosen for these serviceType.algorithms when an application does not specify a security provider.

Application Program Initialization for Cryptographic Operations

Figure 4:
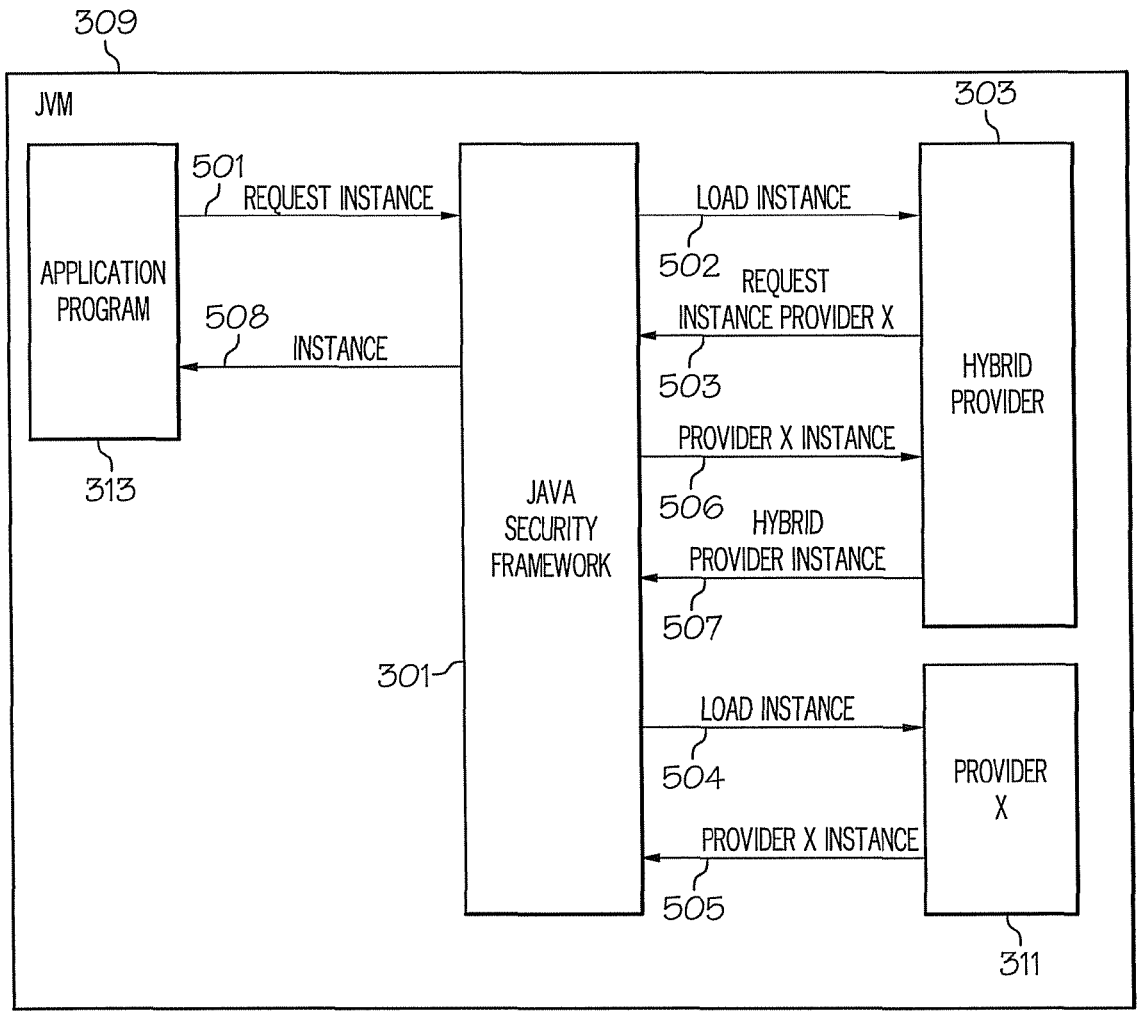
FIG. 4 illustrates an exemplary method for initializing an application program in preparation for requesting one or more cryptographic operations.

FIG. 4 shows an initialization procedure implemented by the application program 313 so that the program will be able to perform cryptographic operations. In step 501, the application program 313 requests a cryptographic object and does not specify a provider, as follows:

serviceType obj=serviceType.getInstance(algorithm);

For example, in the following code fragment, the application program obtains an instance of a MD4 MessageDigest that it will later use to generate message digest values.

MessageDigest msgDigest=MessageDigest.getInstance ("MD4");

When step 508 is completed, the object msgDigest will be a Java Security Framework object with a reference to an instance of the Hybrid Provider 303 class for MD4 Message-Digest.

In step 502, the Java Security Framework 301 (FIGS. 3 and 4) selects the first cryptographic provider that registered for the requested serviceType.algorithm and loads an instance of the class registered by the provider for that serviceType.algorithm by calling its constructor. In this case, the first registered provider is the Hybrid Provider 303.

In step 503 (FIG. 4), the Hybrid Provider 303 verifies that it has initialized its own tables. If not, it obtains a list of all algorithms registered for each defined serviceType as follows:

Set<String>algs=Security.getAlgorithms(serviceType);

and then a list of all providers registered for each serviceType.algorithm as follows:

Provider[ ] providerArray=Security.getProviders(serviceType.algorithm);

When the tables have been constructed (whether while processing this request or while processing a prior request), the Hybrid Provider 303 selects a first provider in its table for the specified serviceType.algorithm. The Hybrid Provider 303 now requests an instance and specifies the provider it has selected, as follows:

serviceType obj=serviceType.getInstance(algorithm, provider);

In step 504, the Java Security Framework 301 loads an instance of the class registered by the provider requested in step 503 for a target serviceType.algorithm by calling its constructor. In step 505, a provider x 311 constructor has executed and an instance of the provider is returned to the Java Security Framework 301. In step 506, the Java Security Framework 301 returns an instance of itself, containing a reference to the provider class for the target serviceType.algorithm, to the Hybrid Provider 301.

In step 507, a Hybrid Provider 303 constructor has executed an instance of the Hybrid Provider 303 class for the target serviceType.algorithm, containing a reference to the Java Security Framework 301 object passed to the Hybrid Provider 303 in step 506. This executed instance of the Hybrid Provider 303 class for the target serviceType.algorithm is returned to the Java Security Framework 301 (step 507). In step 508, the Java Security Framework 301 returns an instance of itself, containing a reference to the Hybrid Provider 303 class for the target serviceType.algorithm, to the application program 313.

A Successful Cryptographic Request

Figure 5:
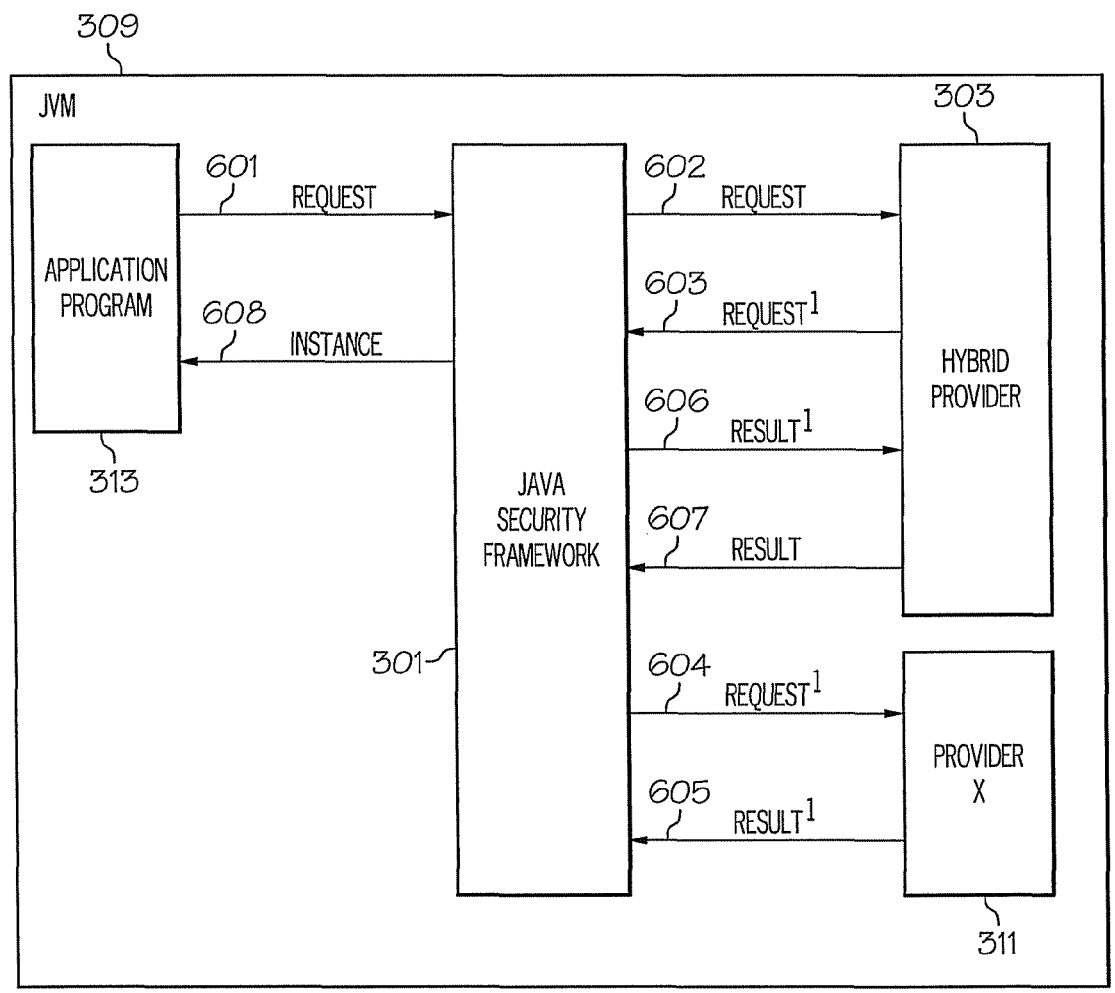
FIG. 5 illustrates an example of a successful cryptographic request in the JVM.

FIG. 5 shows an operational sequence representing a successful cryptographic request. In step 601, the application program 313 (FIGS. 4 and 5) submits a cryptographic request by invoking a method on the Java Security Framework 301 instance it obtained when it invoked serviceType.getInstance (algorithm). For example, in the following code fragment, the application program passes part of the message to be digested:

msgDigest.update("Now is the time for all good men".getBytes( ));

In step 602 (FIG. 5), the Java Security Framework instance passes the request to the Hybrid Provider 303 instance using the reference the request contains. In step 603, the Hybrid Provider 303 class instance passes the request[1] to the Java Security Framework 301 instance using a reference contained by the request. In step 604, the Java Security Framework 301 instance passes the request[1] to a JCE security provider such as provider x 311 using the reference corresponding to the Hybrid Provider 303 request. Accordingly, provider x 311 is an example of a JCE security provider shown in FIG. 3, such as first JCE security provider 305 or nth JCE security provider 307.

In step 605 (FIG. 5), the provider x 311 class returns, to the Java Security Framework 301, a result[1] of processing the request. In step 606, the Java Security Framework 301 returns the result[1] of processing the request to the Hybrid Provider 303 class. In step 607, the Hybrid Provider 303 class returns the result of processing the request to the Java Security Framework 301. In step 608, the Java Security Framework 301 returns the result of processing the request to the application program 313.

A Successful Cryptographic Request, Hybrid Provider Detail

Figure 6:
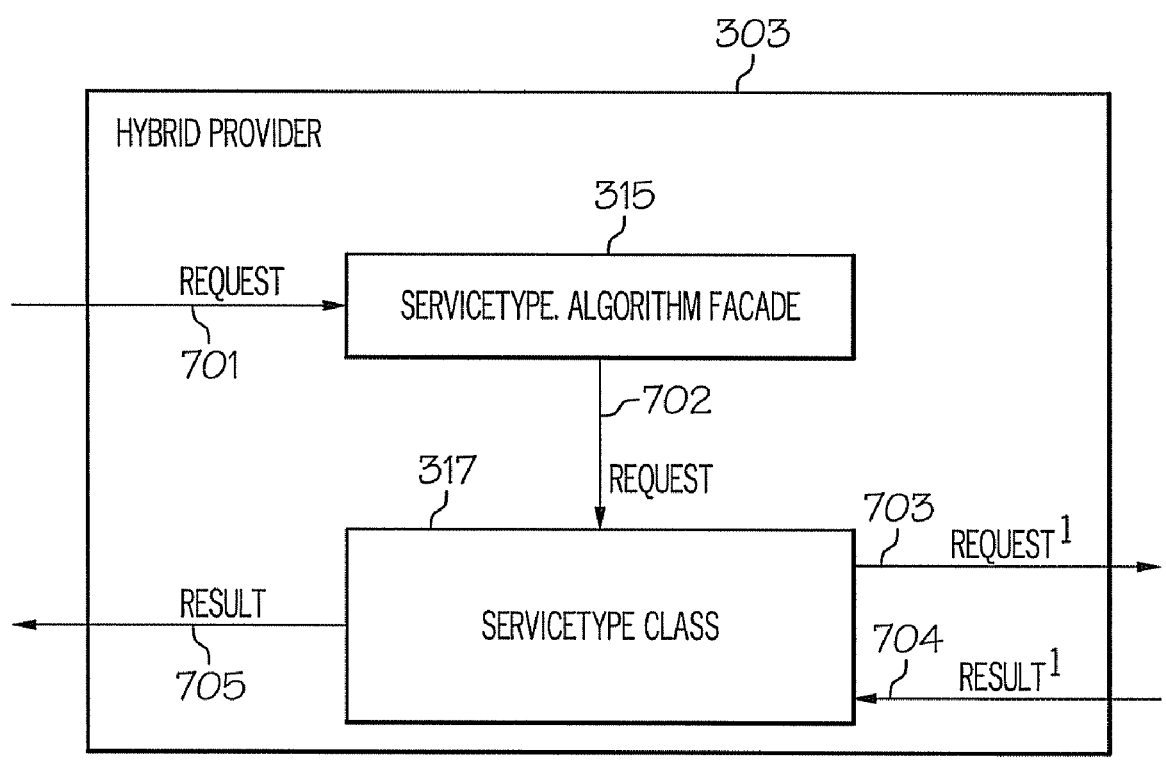
FIG. 6 illustrates an exemplary hybrid provider that may be used to perform the method of FIG. 5.

FIG. 6 shows an illustrative procedure by which the Hybrid Provider 303 (FIGS. 3-6) processes a successful cryptographic request as was briefly described in connection with FIG. 5. In step 701, a request is passed to a serviceType.algorithm façade 315 representing a Hybrid Provider 303 façade class corresponding to a serviceType.algorithm in the application program 313 (FIG. 5) request. The Java Security Framework 301 (FIG. 5) obtained an instance of this class when the application program called getInstance( ).

In step 702 (FIG. 6), the request is passed to a Hybrid Provider serviceType class 317. In step 703, the Hybrid Provider serviceType class 317 passes the request to the Java Security Framework 301 (FIG. 5) as a request[1], so that it will be processed by a JCE Security Provider class that it selected and obtained when the Java Security Framework 301 called the Hybrid Provider serviceType class 317 (FIG. 6) constructor. In step 704, the Java Security Framework returns a result[1], that it received from the JCE Security Provider to the Hybrid Provider 303 serviceType class. In this example, the JCE Security Provider is provider x 311. In step 705, the Hybrid Provider 303 serviceType class returns the result of processing to the Java Security Framework 301 (FIG. 5).

A Cryptographic Request with Failover and a Successful Outcome

Figure 7:
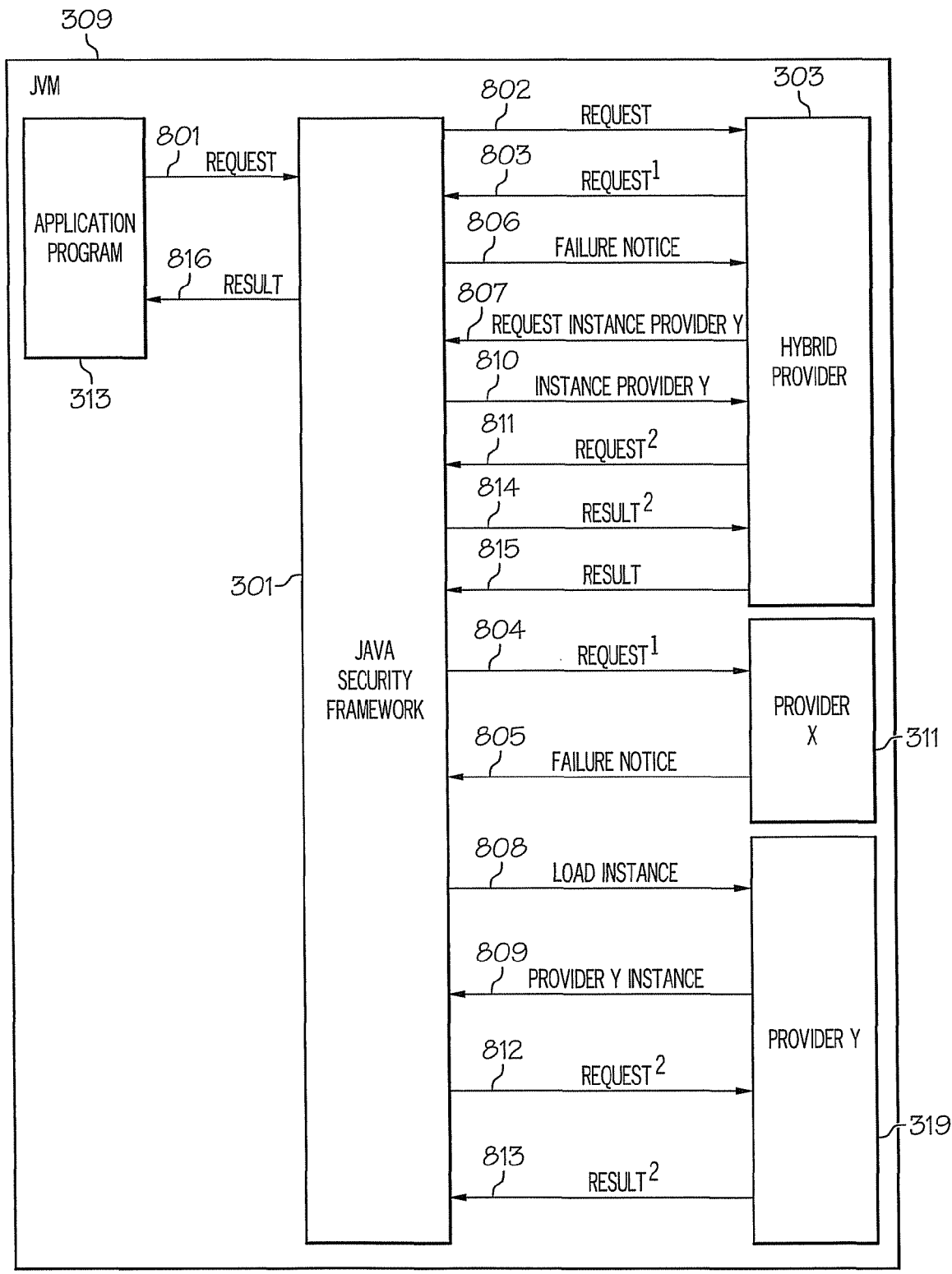
FIG. 7 illustrates an exemplary method for receiving a cryptographic request in the JVM with failover and a successful outcome.

FIG. 7 shows a cryptographic request in the JVM 309 (FIGS. 3-5) with failover and a successful outcome. For the operational sequence described in conjunction with FIG. 7, it is assumed that a selected first JCE security provider (i.e., the provider x 311) is unable to process the request and failover is implemented to a second JCE security provider (i.e., a provider y 319) that successfully processes the request. Generally speaking, there are n JCE security providers registered for the serviceType.algorithm, there are (m−1) JCE security providers that are unsuccessful and the $m^{th}$ JCE security provider is successful, where m<=n.

In step 801, the application program 313 submits a cryptographic request by invoicing a method on the Java Security Framework 301 instance obtained by the Framework when the Framework invoked serviceType.getInstance(algorithm). In the following code fragment, the application program 313 passes part of the message to be digested:

msgDigest.update("Now is the time for all good men".getBytes( ));

Next, in step 802, the Java Security Framework 301 instance passes the request to the Hybrid Provider 303 instance using a reference contained in the request. In step 803, the Hybrid Provider 303 class instance passes the request[1] to the Java Security Framework 301 instance using the reference contained in the request. In step 804, the Java Security Framework 301 instance passes the request[1] to a first JCE security provider, such as provider x 311, using the reference corresponding to the Hybrid Provider 303 request.

In step 805, the JCE security provider class attempts to process the request but is unsuccessful. (This can occur, for example, if the JCE security provider depends on a hardware resource that has become unavailable.) The JCE security provider class (i.e., service provider x 311) returns, to the Java Security Framework 301, a notification of failure. In step 806, the Java Security Framework 301 passes the notification of failure for request[1] to the Hybrid Provider 303 class.

In step 807, the Hybrid Provider 303 class selects the next JCE security provider in its table for the specified serviceType.algorithm and requests an instance associated with the class registered by the new JCE security provider for the target serviceType.algorithm. In this example, the next JCE security provider is provider y 319. In step 808, the Java Security Framework 301 loads an instance of the class registered by the JCE security provider requested in step 807 for the target serviceType.algorithm by calling its constructor. In step 809, a constructor for provider y 319 has executed and an instance of the JCE security provider is returned to the Java Security Framework.

In step 810, the Java Security Framework returns an instance of itself, containing a reference to a provider class for the target serviceType.algorithm, to the Hybrid Provider 303. The Hybrid Provider 303 replaces the former reference (associated with the previously selected JCE security provider, i.e., provider x 311) with the new reference. In step 811, the Hybrid Provider 303 class instance passes the request$^2$ to the Java Security Framework 301 instance using the reference the request$^2$ now contains. In step 812, the Java Security Framework 301 instance passes the request$^2$ to a JCE security provider denoted as provider y 319 using the reference corresponding to the Hybrid Provider 303 request.

In step 813, the JCE security provider class (i.e., the provider y 319 class) returns, to the Java Security Framework 301, the result$^2$ of processing the request. In step 814, the Java Security Framework 301 returns the result$^2$ of processing the request to the Hybrid Provider 303 class. In step 815, the Hybrid Provider 303 class returns the result of processing the request to the Java Security Framework 301. In step 816, the Java Security Framework 301 returns the result of processing the request to the application program 313.

Figure 8:
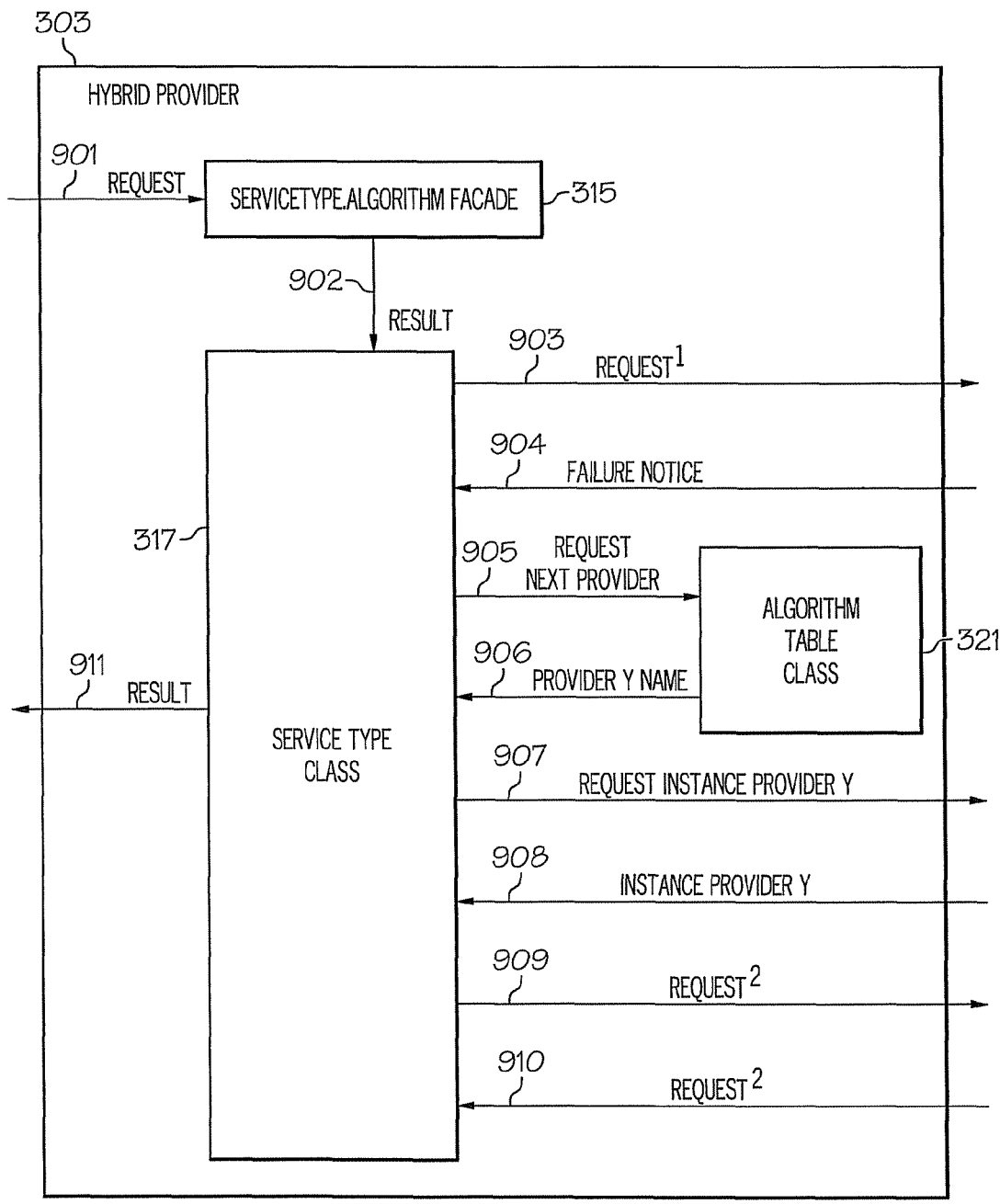
FIG. 8 illustrates an exemplary hybrid provider that may be used to perform the method of FIG. 7.

A Cryptographic Request with Failover and a Successful Outcome, Hybrid Provider Detail FIG. 8 shows an illustrative operational sequence performed by the Hybrid Provider 303 of FIG. 7. In step 901, a request is passed to a serviceType.algorithm façade 315 of the Hybrid Provider 303, wherein the serviceType.algorithm façade 315 corresponds to a serviceType.algorithm in an application program 313 (FIG. 7) request. The Java Security Framework 301 obtained an instance of this class when the application program 313 called getInstance( ). In step 902 (FIG. 8), the request is passed to a Hybrid Provider serviceType class 317. In step 903, the Hybrid Provider serviceType class 917 passes the request to the Java Security Framework 301 (FIG. 7) as a request$^1$, so that the request$^1$ will be processed by a JCE Security Provider class that the requests selected and obtained when the Java Security Framework 301 called the Hybrid Provider serviceType class constructor as discussed previously in connection with FIG. 7.

In step 904 (FIG. 8), the Hybrid Provider serviceType class 317 receives, from the Java Security Framework 301 (FIG. 7), notification that request processing has failed. In step 905 (FIG. 8), the Hybrid Provider serviceType class 317 requests from a Hybrid Provider Algorithm Table class 321, a name of a next provider that registered for the target serviceType.algorithm. In step 906, the Hybrid Provider Algorithm Table class 321 returns the name of the next provider that registered for the target serviceType.algorithm. In step 907, the Hybrid Provider serviceType class 317 requests, from the Java Security Framework 301 (FIG. 7), an instance associated with the class registered by the new JCE security provider (i.e., provider y 319) for the target serviceType.algorithm.

In step 908 (FIG. 8), the Java Security Framework 301 (FIG. 7) returns an instance of itself, containing a reference to a provider class for the target serviceType.algorithm, to the Hybrid Provider 303 (FIGS. 7 and 8). The Hybrid Provider serviceType class 317 (FIG. 8) replaces a former reference (associated with the previously selected JCE security provider, provider x 311, FIG. 7) with the new reference (corresponding to provider y 319). In step 909 (FIG. 8), the Hybrid Provider serviceType class 317 passes the request$^2$ to the Java Security Framework 301 (FIG. 7) instance using the reference the request$^2$ now contains. In step 910 (FIG. 8), the Java Security Framework 301 (FIG. 7) returns a result$^2$, that the Framework received from the JCE Security Provider (provider y 319, FIG. 7), to the Hybrid Provider serviceType class 317 (FIG. 8). In step 911, the Hybrid Provider serviceType class 317 returns the result of processing to the Java Security Framework 301 (FIG. 7).

A Cryptographic Request with Failover and an Unsuccessful Outcome

Figure 9:
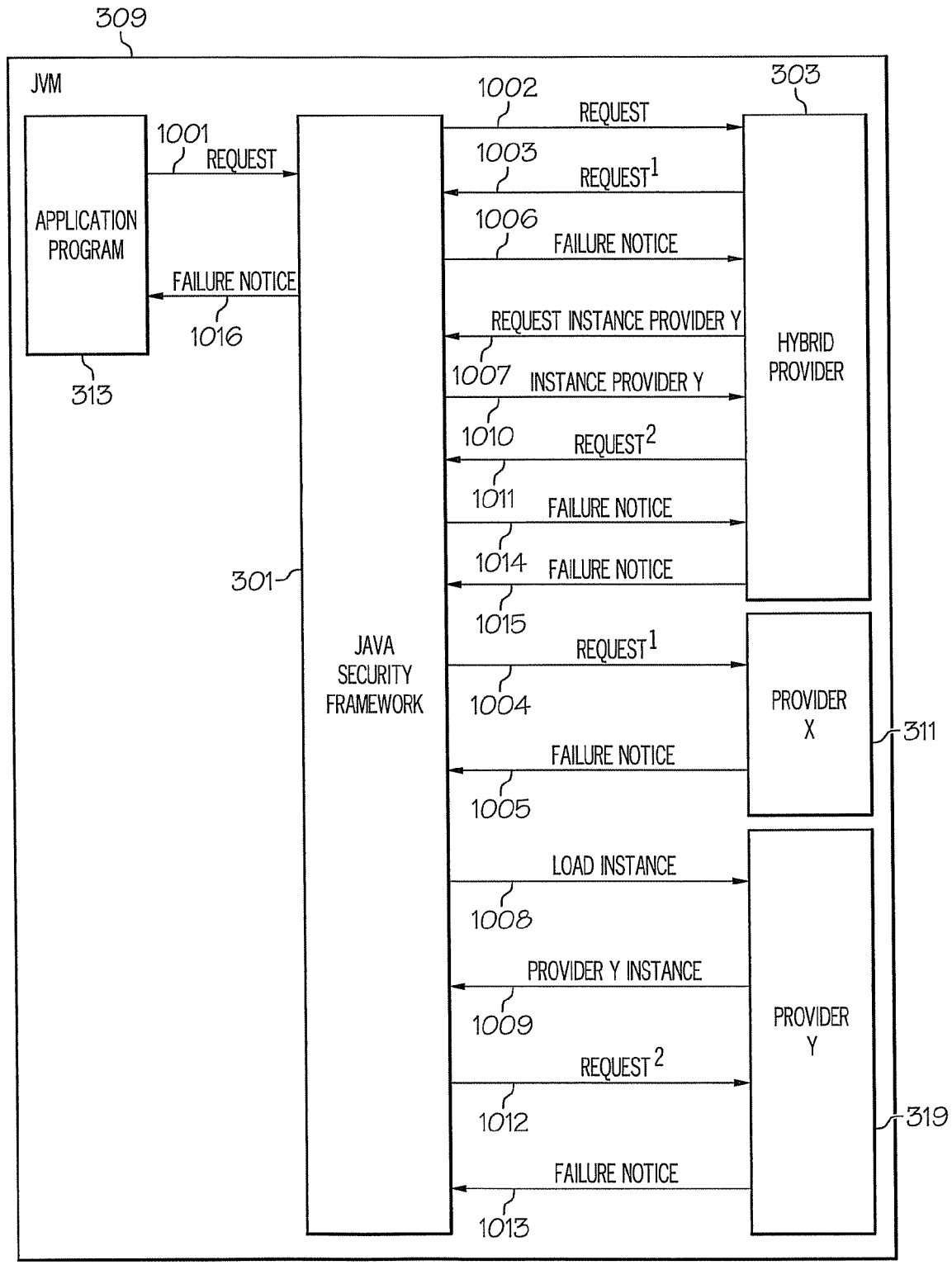
FIG. 9 illustrates an exemplary method for receiving a cryptographic request in the JVM with failover and an unsuccessful outcome.

FIG. 9 shows a cryptographic request in the JVM 309 with failover and an unsuccessful outcome. In the flow described herein, there are two JCE security providers registered for the serviceType.algorithm (provider x 311 and provider y 319), and both providers are unsuccessful when attempting to process a request. In a general case, there are n JCE security providers registered for the serviceType.algorithm, and all are unsuccessful when attempting to process the request.

In step 1001, the application program 313 submits a cryptographic request by invoking a method on the Java Security Framework 301 instance obtained by the Framework when the program invoked serviceType.getInstance(algorithm). For example, in the following code fragment, the application program passes part of a message or request to be digested:
msgdigest.update("Now is the time for all good men".getBytes( );

In step 1002, the Java Security Framework 301 instance passes the request to the Hybrid Provider 303 instance using the reference the request contains. In step 1003, the Hybrid Provider 303 class instance passes the request$^1$ to the Java Security Framework 301 instance using the reference the request$^1$ contains. In step 1004, the Java Security Framework 301 instance passes the request$^1$ to a first JCE security provider (such as provider x 311) using the reference corresponding to the Hybrid Provider 303 request.

In step 1005, the JCE security provider class (provider x 311) attempts to process the request but is unsuccessful. (This can occur, for example, if the JCE security provider depends on a hardware resource that has become unavailable.) The JCE security provider class returns, to the Java Security Framework 301, a notification of failure. In step 1006, the Java Security Framework 301 passes the notification of failure for the request$^1$ to the Hybrid Provider 303 class.

In step 1007, the Hybrid Provider 303 class selects the next JCE security provider in its table for the specified serviceType.algorithm (provider y 319) and requests an instance associated with the class registered by the new JCE security provider for the target serviceType.algorithm. In step 1008, the Java Security Framework 301 loads an instance of the class registered by the JCE security provider requested in step 1007 for the target serviceType.algorithm by calling its constructor.

In step 1009, a constructor for provider y 319 has executed and an instance of the JCE security provider is returned to the Java Security Framework 301. In step 1010, the Java Security Framework 301 returns an instance of itself, containing a reference to a provider class for the target serviceType.algorithm, to the Hybrid Provider 303. The Hybrid Provider 303 replaces the former reference (associated with the previously selected JCE security provider, provider x 311) with the new reference (i.e., associated with provider y 319). In step 1011, the Hybrid Provider 303 class instance passes the request$^2$ to the Java Security Framework 301 instance using the reference it now contains.

In step 1012, the Java Security Framework 301 instance passes the request$^2$ to a second JCE security provider (provider y 319) using the reference corresponding to the Hybrid Provider 303 request. In step 1013, the JCE security provider class (provider y 313) returns a notification of failure to the Java Security Framework 301. In step 1014, the Java Security Framework 301 returns the failure notice to the Hybrid Provider class 303. In step 1015, the Hybrid Provider 303 class returns the failure notice to the Java Security Framework 301.

In step 1016, the Java Security Framework 301 returns the failure notice to the application program 313.

Figure 10:
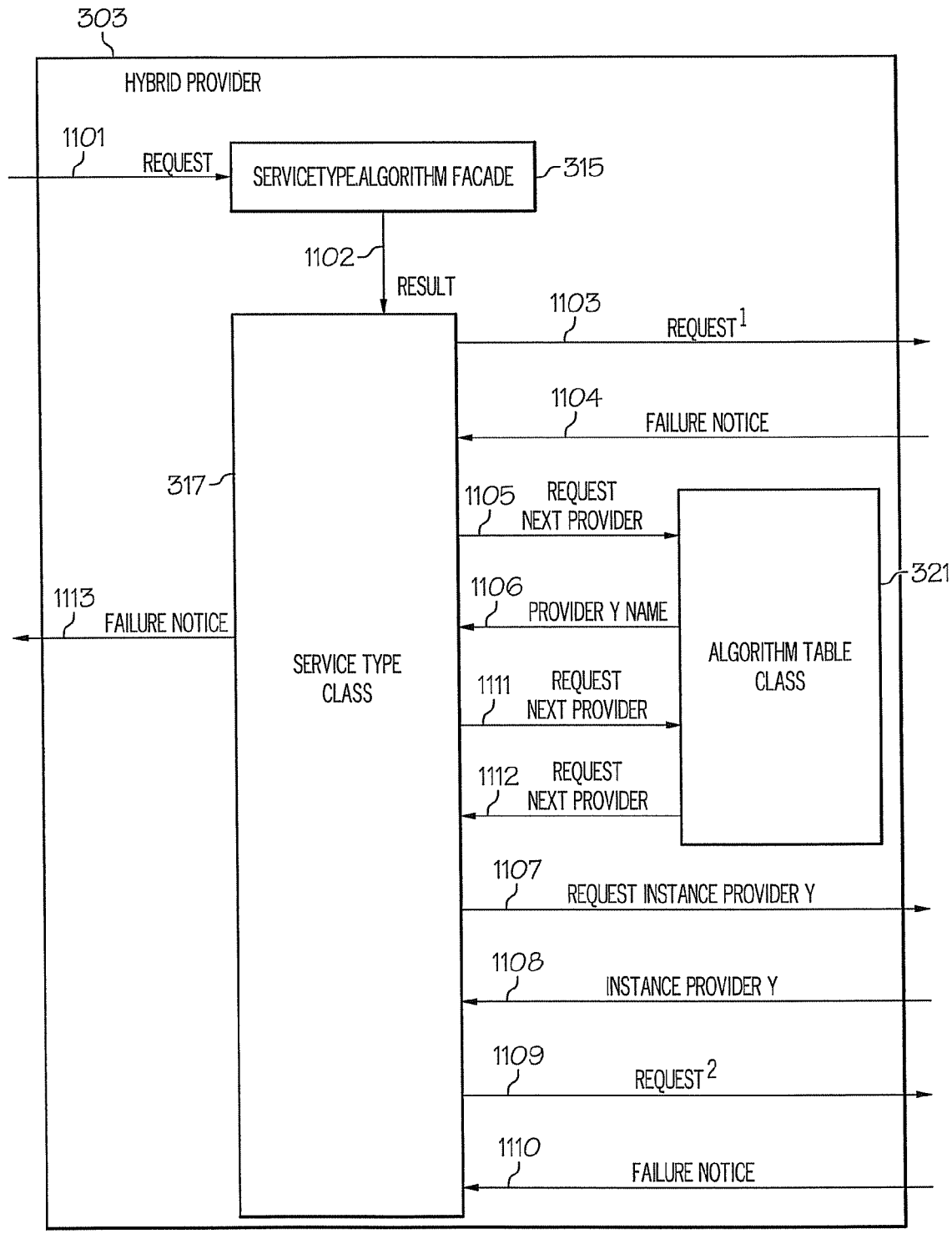
FIG. 10 illustrates an exemplary hybrid provider that may be used to perform the method of FIG. 9.

A Cryptographic Request with Failover and an Unsuccessful Outcome, Hybrid Provider Detail FIG. 10 shows an illustrative operational sequence performed by the Hybrid Provider 303 of FIG. 9. In step 1101, a request is passed to the Hybrid Provider service.Type algorithm façade 315 (FIGS. 9 and 10) corresponding to the serviceType.algorithm in the application program 313 (FIG. 9) request. The Java Security Framework 301 obtained an instance of this class when the application program called getInstance( ). In step 1102 (FIG. 10), the request is passed to the Hybrid Provider serviceType class 317 (FIGS. 9 and 10). In step 1103 (FIG. 10), the Hybrid Provider serviceType class 317 passes the request to the Java Security Framework 301 (FIG. 9) as a request[1], so that the request[1] will be processed by a JCE Security Provider class specified by request[1] and obtained when the Java Security Framework 301 called the Hybrid Provider 303 serviceType class constructor.

In step 1004 (FIG. 10), the Hybrid Provider serviceType class 317 receives, from the Java Security Framework 301 (FIG. 9), notification that the request processing has failed. In step 1005 (FIG. 10), the Hybrid Provider serviceType class 317 requests, from the Hybrid Provider Algorithm Table class 321, a name of a next provider that registered for the target serviceType.algorithm. In step 1006, the Hybrid Provider Algorithm Table class 321 returns the name of the next provider that registered for the target serviceType.algorithm. In step 1007, the Hybrid Provider serviceType class 317 requests, from the Java Security Framework 301 (FIG. 9), an instance associated with the class registered by a new JCE security provider (i.e., provider y 319) for the target serviceType.algorithm.

In step 1008 (FIG. 10), the Java Security Framework 301 (FIG. 9) returns an instance of itself, containing a reference to the provider class for the target serviceType.algorithm, to the Hybrid Provider 303 (FIGS. 9 and 10). The Hybrid Provider serviceType class 317 replaces the former reference (associated with the previously selected JCE security provider, provider x 311, FIG. 9) with a new reference associated with provider y 319. In step 1009 (FIG. 10), the Hybrid Provider serviceType class 317 passes the request[2] to the Java Security Framework 301 (FIG. 9) instance using the reference that request[2] now contains. In step 1010 (FIG. 10), the Java Security Framework 301 (FIG. 9) returns the failure notice to the Hybrid Provider serviceType class 317 (FIG. 10).

In step 1011, the Hybrid Provider serviceType class 317 requests, from the Hybrid Provider Algorithm Table class 321, a name of a next provider that registered for the target serviceType.algorithm. In step 1012, the Hybrid Provider Algorithm Table class 321 returns notification that there are no more providers registered for the target serviceType.algorithm. In step 1013, the Hybrid Provider serviceType class 317 returns the failure notice to the Java Security Framework 301 (FIG. 9).

The Hybrid Provider 303 of FIGS. 3-10 fits into the Java Security Framework 301 (FIGS. 3, 4, 5, 7, and 9) and registers for serviceType.algorithm pairs as if it were a real security provider, even though the Hybrid Provider 303 does not, itself, provide any security services at all. The Hybrid Provider 303 functions as a router designed to provide failover from one JCE security provider to another.

Illustratively, the Hybrid Provider 303 is installed in the JVM 309 (FIGS. 3, 4, 5, 7, and 9). The Hybrid Provider 303 extends the recovery capabilities of the Java Security Framework 301 without modifying the Java Security Framework 301. The Hybrid Provider 303 provides failover from (and to) any and all JCE security providers configured in the JVM 309. The Hybrid Provider 303 provides error recovery for an application without any modifications needed to the application itself.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for performing cryptographic provider failover via computer instructions in a storage device of a computer, the method via the computer instructions in the storage device of the computer including:

upon receipt of a first security request, constructing by an integrated cryptographic provider a table comprising a list of a plurality of underlying cryptographic providers for a plurality of service type algorithm pairs on the computer;

wherein the integrated cryptographic provider is one of the plurality of underlying cryptographic providers in the list of the table;

wherein the plurality of underlying cryptographic providers are registered as hardware cryptographic providers and software cryptographic providers in the list of the table; and wherein the integrated cryptographic provider is registered as a routing cryptographic provider in the list of the table;

arranging the list in the table of the plurality of underlying cryptographic providers so that the integrated cryptographic provider registered as the routing cryptographic provider has the highest priority in the list in the table and so that the plurality of underlying cryptographic providers have a lower priority in the list in the table than the integrated cryptographic provider; and utilizing the integrated cryptographic provider to specify failover support for all registered service type algorithm pairs using one or more of the plurality of underlying cryptographic providers;

wherein in response to a subsequent security request received from an application, the integrated cryptographic provider being the routing cryptographic provider that constructed the table utilizes the list of the plurality of underlying cryptographic providers to identify a second cryptographic provider to which the request will be routed if a first cryptographic provider fails.

2. The method of claim 1 wherein the integrated cryptographic provider comprises a routing cryptographic provider.

3. The method of claim 1 wherein the one or more underlying cryptographic providers includes a hardware provider.

4. The method of claim 1 wherein the one or more underlying cryptographic providers includes at least one of a hardware provider, a software provider, or a firmware provider.

5. The method of claim 1 further including the integrated cryptographic provider performing a check to ensure that a security request satisfies a set of requirements before routing the request to the one or more underlying cryptographic providers.

6. The method of claim 1 further including the integrated cryptographic provider performing a check to ascertain whether or not hardware is available.

7. The method of claim 1 further including the integrated cryptographic provider checking one or more key sizes.

8. The method of claim 1 further including the integrated cryptographic provider checking one or more key types.

9. A computer program product for performing cryptographic provider failover, the computer program product comprising a non-transitory computer readable storage medium for storing instructions which, when executed on a computer, causes the computer to perform a method comprising:

upon receipt of a first security request, constructing by the integrated cryptographic provider a table comprising a list of a plurality of underlying cryptographic providers for a plurality of service type algorithm pairs on the computer;

wherein the integrated cryptographic provider is one of the plurality of underlying cryptographic providers in the list of the table;

wherein the plurality of underlying cryptographic providers are registered as hardware cryptographic providers and software cryptographic providers in the list of the table; and wherein the integrated cryptographic provider is registered as a routing cryptographic provider in the list of the table;

arranging the list in the table of the plurality of underlying cryptographic providers so that the integrated cryptographic provider registered as the routing cryptographic provider has the highest priority in the list in the table and so that the plurality of underlying cryptographic providers have a lower priority in the list in the table than the integrated cryptographic provider; and utilizing the integrated cryptographic provider to specify failover support for all registered service type algorithm pairs using one or more of the plurality of the underlying cryptographic providers;

wherein in response to a subsequent security request received from an application, the integrated cryptographic provider being the routing cryptographic provider that constructed the table utilizes the list of the plurality of underlying cryptographic providers to identify a second cryptographic provider to which the request will be routed if a first cryptographic provider fails.

10. The computer program product of claim 9 wherein the integrated cryptographic provider comprises a routing cryptographic provider.

11. The computer program product of claim 9 wherein the one or more underlying cryptographic providers includes a hardware provider.

12. The computer program product of claim 9 wherein the one or more underlying cryptographic providers includes at least one of a hardware provider, a software provider, or a firmware provider.

13. The computer program product of claim 9 further including instructions for the integrated cryptographic provider performing a check to ensure that a security request satisfies a set of requirements before routing the request to the one or more underlying cryptographic providers.

14. The computer program product of claim 9 further including instructions for the integrated cryptographic provider performing a check to ascertain whether or not hardware is available.

15. The computer program product of claim 9 further including instructions for the integrated cryptographic provider checking one or more key sizes.

16. The computer program product of claim 9 further including instructions for the integrated cryptographic provider checking one or more key types.

* * * * *